(12) United States Patent
Ma et al.

(10) Patent No.: US 9,976,065 B2
(45) Date of Patent: May 22, 2018

(54) POLYURETHANE LAMINATING ADHESIVE COMPOSITION

(71) Applicant: 3M INNOVATIVE PROPERTIES COMPANY, St. Paul, MN (US)

(72) Inventors: Jingjing Ma, Cottage Grove, MN (US); Mary M. Caruso Dailey, Maplewood, MN (US); Dmitri D. Iarikov, St. Paul, MN (US); Alexander J. Kugel, Woodbury, MN (US); Yongshang Lu, Woodbury, MN (US); Christopher B. Walker, Jr., St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days. days.

(21) Appl. No.: 15/309,643

(22) PCT Filed: Jun. 5, 2015

(86) PCT No.: PCT/US2015/034416
§ 371 (c)(1),
(2) Date: Nov. 8, 2016

(87) PCT Pub. No.: WO2015/188067
PCT Pub. Date: Dec. 10, 2015

(65) Prior Publication Data
US 2017/0247587 A1    Aug. 31, 2017

Related U.S. Application Data

(60) Provisional application No. 62/008,873, filed on Jun. 6, 2014.

(51) Int. Cl.
*C09J 11/06* (2006.01)
*C09J 175/04* (2006.01)

(52) U.S. Cl.
CPC ............. *C09J 175/04* (2013.01); *C09J 11/06* (2013.01)

(58) Field of Classification Search
CPC .................................. C09J 11/06; C09J 175/04
See application file for complete search history.

(56) References Cited

U.S. PATENT DOCUMENTS

| | | | |
|---|---|---|---|
| 5,554,686 A * | 9/1996 | Frisch, Jr. | ........... C08G 18/0804 524/588 |
| 6,017,998 A | 1/2000 | Duan et al. | |
| 6,310,125 B1 | 10/2001 | Rayner | |
| 6,838,516 B2 | 1/2005 | Dai | |
| 6,866,235 B2 | 3/2005 | Zimmermann | |
| 7,326,374 B2 | 2/2008 | Hatanaka | |
| 8,247,079 B2 | 8/2012 | Griswold | |
| 8,247,514 B2 | 8/2012 | Griswold | |
| 2003/0191233 A1 * | 10/2003 | Lin | ........................ C08L 23/22 524/588 |
| 2005/0137374 A1 | 6/2005 | Roesler et al. | |
| 2006/0142532 A1 | 6/2006 | Wintermantel | |
| 2009/0202824 A1 | 8/2009 | Hasumi | |
| 2009/0240005 A1 | 9/2009 | Kraus | |
| 2011/0157525 A1 | 6/2011 | Yamasaki | |
| 2012/0225302 A1 | 9/2012 | Buchner | |
| 2013/0015909 A1 | 1/2013 | Kim | |
| 2013/0095309 A1 | 4/2013 | Suzuki | |
| 2013/0236673 A1 | 9/2013 | Kim | |
| 2014/0044961 A1 | 1/2014 | Takami | |
| 2014/0065415 A1 | 3/2014 | Sasaki | |
| 2014/0087070 A1 | 3/2014 | Liu | |
| 2014/0127504 A1 | 5/2014 | Sasaki | |

FOREIGN PATENT DOCUMENTS

| | | |
|---|---|---|
| EP | 2692756 | 2/2014 |
| EP | 2692758 | 2/2014 |
| EP | 2173784 | 4/2014 |
| JP | 2004-067803 | 3/2004 |
| JP | 2009-215355 | 9/2009 |
| JP | 2012-131877 | 7/2012 |
| WO | WO 2011-092108 | 4/2011 |
| WO | WO 2013-116628 | 8/2013 |
| WO | WO 2013-180008 | 12/2013 |
| WO | WO 2014-002203 | 1/2014 |
| WO | WO 2015/130949 | 9/2015 |
| WO | WO 2015-183654 | 12/2015 |

OTHER PUBLICATIONS

Author Unknown, "Dispercoll U 42, Aqueous Polyurethane Dispersion", Bayer MaterialScience Bulletin, Jul. 2002, pp. 1 and 2.*
Arizona, "Tackifiers for Adhesives", Feb. 2010, 8 pgs.
Bayer, "The Chemistry of Polyurethane Coatings", 31 pgs.
Gelest, "Silane Coupling Agents", 2006, 60 pgs.
International Search Report for PCT International Application No. PCT/US2015/34416, dated Aug. 25, 2015, 3pgs.

* cited by examiner

*Primary Examiner* — Patrick D Niland
(74) *Attorney, Agent, or Firm* — Steven A. Bern; Philip Y. Dahl

(57) ABSTRACT

There is provided an adhesive composition comprising at least 50 wt % of an aqueous dispersion of an amorphous polyurethane having a Tg below 25° C.; and a water dispersible cross-linker, where the adhesive composition has a peel retention of greater than or equal to 5% according to the Water/IPA Exposure Test.

3 Claims, No Drawings

POLYURETHANE LAMINATING ADHESIVE COMPOSITION

FIELD

The present disclosure relates to an adhesive composition comprising an aqueous dispersion of an amorphous polyurethane (PU), a water dispersible crosslinker and optionally a coupling agent.

SUMMARY

In some aspects, the present disclosure provides an adhesive composition comprising: at least 50 wt % of an aqueous dispersion of an amorphous polyurethane having a Tg below 25° C.; and water dispersible cross-linker, wherein the adhesive composition has a peel retention of greater than or equal to 5% according to the Water/IPA Exposure Test. In some embodiments, the adhesive composition has a peel retention of greater than or equal to 80% according to the Olive Oil Exposure Test.

In some embodiments, the aforementioned adhesive composition also include an adhesion promoter. In some embodiments, the adhesion promoter is a silane adhesion promoter.

In some embodiments, an adhesive made using the aforementioned adhesive composition is a laminating adhesive. In some embodiments, the laminating adhesive is activated at ambient temperature.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Before any embodiments of the invention are explained in detail, it is to be understood that the invention is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated. These are only examples of what is specifically intended, and all possible combinations of numerical values between and including the lowest value and the highest value enumerated are to be considered to be expressly stated in this application.

Automotive, aerospace and electronics markets have been long demanding higher performance adhesives with good peel adhesion at high and low temperatures and chemical resistance. In these applications, adhesives are required to maintain adequate strength in harsh conditions, including for example exposure to high temperatures, low temperatures, humidity, oil, and common chemicals. The present disclosure provides a chemical resistant adhesive composition comprising an aqueous dispersion of an amorphous polyurethane, a water dispersible crosslinker and optionally a silane coupling agent. This adhesive composition is non-tacky by touch but can be laminated to solid substrates at ambient temperature in the same way as pressure sensitive adhesives (PSA). In some embodiments, an adhesive made using the presently disclosed adhesive composition is a laminating adhesive. In some embodiments, the laminating adhesive is activated at ambient temperature.

Aqueous Dispersion of Amorphous Polyurethane (PU)

The presently disclosed adhesive composition contains an aqueous dispersion of amorphous polyurethane. The content of the aqueous dispersion of amorphous polyurethane of the present disclosure is preferably 50 wt % to 99 wt %, more preferably 70 wt % to 99 wt %, and still more preferably 90 wt % to 99 wt %. Adjusting the content of the aqueous dispersion of amorphous polyurethane in the presently disclosed adhesive within the range can provide an adhesive composition excellent in, for example, peel adhesion, and chemical resistance.

In some embodiments, the presently disclosed aqueous dispersion of amorphous polyurethane is obtained by reacting a composition containing a polyol (A) and a polyfunctional isocyanate compound (B).

Any appropriate polyol can be adopted as the polyol (A) as long as the polyol has two or more OH groups. Examples of such polyol (A) include a polyol having two OH groups (diol), a polyol having three OH groups (triol), a polyol having four OH groups (tetraol), and mixtures thereof. The polyol (A) preferably contains a polyol having a number-average molecular weight Mn of 400 to 20,000. The content of the polyol having a number-average molecular weight Mn of 400 to 20,000 in the polyol (A) is preferably 40 wt % to 90 wt %, and more preferably 70 wt % to 90 wt %. Adjusting the content of the polyol having a number-average molecular weight Mn of 400 to 20,000 in the polyol (A) within the range can provide an adhesive composition excellent in, for example, peel adhesion and chemical resistance.

Examples of the polyol (A) include a polyester polyol, a polyether polyol, a polycaprolactone polyol, a polycarbonate polyol, and a castor oil-based polyol. The polyester polyol can be obtained by, for example, an esterification reaction between a polyol component and an acid component. Examples of the polyol component include ethylene glycol, diethylene glycol, 1,3-butanediol, 1,4-butanediol, neopentyl glycol, 3-methyl-1,5-pentanediol, 2-butyl-2-ethyl-1,3-propanediol, 2,4-diethyl-1,5-pentanediol, 1,2-hexanediol, 1,6-hexanediol, 1,8-octanediol, 1,9-nonanediol, 2-methyl-1,8-octanediol, 1,8-decanediol, octadecanediol, glycerin, trimethylolpropane, pentaerythritol, hexanetriol, and polypropylene glycol.

The number of kinds of the polyfunctional isocyanate compounds (B) may be only one, or maybe two or more. Any appropriate polyfunctional isocyanate compound that may be used in a urethane-forming reaction may be adopted as the polyfunctional isocyanate compound (B). Examples of such polyfunctional isocyanate compound (B) include a polyfunctional aliphatic isocyanate compound, a polyfunctional alicyclic isocyanate compound, and a polyfunctional aromatic isocyanate compound. Examples of the polyfunctional aliphatic isocyanate compound include trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate, and 2,4,4-trimethylhexamethylene diisocyanate.

Examples of the polyfunctional alicyclic isocyanate compound include 1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, and hydrogenated tetramethylxylylene diisocyanate.

Examples of the polyfunctional aromatic diisocyanate compound include phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate, and xylylene diisocyanate.

Other examples of the polyfunctional isocyanate compound (B) include trimethylolpropane adducts of the various polyfunctional isocyanate compounds as described above, biurets thereof obtained through their reactions with water, and trimers thereof each having an isocyanurate ring. In addition, they may be used in combination.

In some embodiments, the presently disclose aqueous dispersion of amorphous polyurethane is selected from one commercially available under the trade designation "DISPERCOLL U42" from Bayer Materials Science, LLC, Pittsburgh, Pa.

In some embodiments, the presently disclosed aqueous dispersion of amorphous polyurethane may include silyl-terminated polyurethane dispersions. In general, the silyl-terminated polyurethane dispersions are prepared by first forming a polyurethane prepolymer. The polyurethane prepolymer is prepared from at a polyol component, at least one isocyanate reactive anionic water solubilizing component, at least one polyisocyanate component, and optionally polyol and/or poylamine chain extenders. This prepolymer is then neutralized, partially terminated with alkoxy silane, and chain extended with a difunctional hydrazide or hydrazine compound. The polyurethane is dispersed in water prior to or after being chain extended with the difunctional hydrazide or hydrazine compound. Following hydrolysis the alkoxy silane groups are converted to —Si—OH that are curable to form siloxane linkages —Si—O—Si—.

A suitable anionic water-solubilizing component is represented by the formula $(HB)_2R^1A$; wherein A is an anionic water-solubilizing moiety; B is O, S, NH or NR wherein R is an alkyl group comprising 1 to 4 carbon atoms; and R' represents an organic linking group having a valence of at least 3, typically comprising about 2 to about 25 carbon atoms. A is typically an anionic water solubilizing group such as —$CO_2M$, —$OSO_3M$, —$SO_3M$, —$OPO(OM)_2$, —$PO(OM)_2$, wherein M is H or a cation such as sodium, potassium, and calcium. Illustrative anionic water solubilizing components include dihydroxycarboxylic acids, dihydroxysulphonic acids, dihydroxyphosphonic acids and salts thereof.

In any of the previous embodiments, the presently disclosed aqueous dispersion of amorphous polyurethane may be made using a chain extender. A portion of the isocyanate groups of the isocyanate terminated polyurethane prepolymer (such as polyfunctional isocyanate compounds (B)) are chain extended with a difunctional hydrazine or hydrazide compound. Difunctional hydrazine compounds include anhydrous hydrazine has the formula $H_2N$—$NH_2$, as well as hydrazine hydrate that is typically 50-60% hydrazine.

Dihydrazides include for example carbodihydrazide (CDH) and thiocarbohydrazide, depicted as follows:

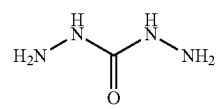

carbohydrazide,

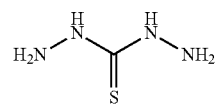

thiocarbohydrazide, as well as dihydrazides having the following formula:

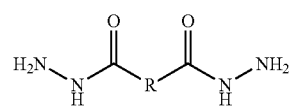

where R is a covalent bond (such as in the case of oxalic dihydrazide), a heteratom such as nitrogen (such as in the case of imidodicarboxylic acid dihydrazide) or a polyvalent (e.g. divalent) organic radical, such as (e.g. $C_1$-$C_{18}$) alkylene, optionally comprising contiguous heteroatoms such as oxygen or nitrogen; arylene (e.g. phenyl) typically having a molecular weight no greater than 500, 400, or 300 g/mole. Some illustrative dihydrazides are depicted as follows:

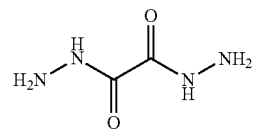

Oxalic dihydrazide

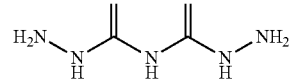

Imidodicarboxylic acid dihydrazide

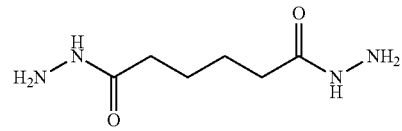

Adipic dihydrazide (ADH)

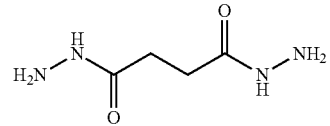

Succinic dihydrazide (SDH)

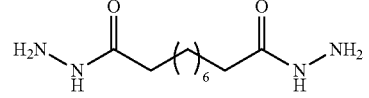

Sebasic acid dihydrazide

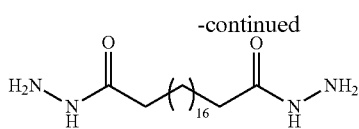

Icosanedioic acid dihydrazide

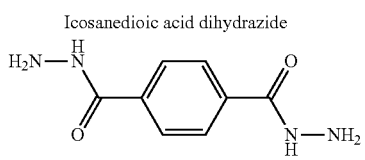

Isophthalic Dihydrazide (IDH)

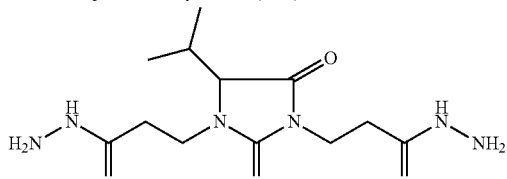

valine dihydrazide

In some embodiments, hydrazine and/or dihydrazide compound(s) are utilized in an amount of at least 0.1, 0.2, 0.3, 0.4, or 0.5 wt-% ranging up to 5, 6, 7, 8, 9, or 10 wt-% based on the total weight of the polyurethane prior to hydrolysis. Thus, the polyurethane comprises urea moieties derived from hydrazine and/or dihydrazide compound(s). The hydrazine and/or dihydrazide moieties are present in the hydrolyzed polyurethane is about the same ranges as just described.

In some embodiments, a portion of the isocyanate groups of the isocyanate terminated polyurethane prepolymer are chain extended with a multifunctional (e.g. difunctional) amine chain extender. Examples of useful diamine chain extenders include but are not limited to those selected from the group consisting of 4,4'-methylene bis(o-chloroaniline) (MOCA or MBOCA), 2,5-diethyl-2,4-toluene diamine (DETDA), 4,4'-methylene bis(3-chloro-2,6-diethylaniline) (MCDEA), propylene glycol bis(4,4'-aminobenzoate), 3,5-di(thiomethyl)-2,4-toluene diamine, methylene bis(4,4'-aniline)(MDA), ethyl-1,2-di(2-amino thiophenol), 4-chloro-3, 5-diamino isobutylbenzoate, 1,2-diaminoethane, 1,4-diaminobutane, 1,6-diaminohexane, N, N'-dialkyl (methylene dianiline), N, N'-dialkyl(1,4-diaminobenzene), and mixtures thereof.

In some embodiments, multifunctional amines, and especially diamine(s) chain extenders are utilized in an amount of at least 0.1, 0.2, 0.3, 0.4 or 0.5 wt % ranging up to 5, 6, 7, 8, 9, or 10 wt % based on the total weight of the polyurethane prior to hydrolysis. In some embodiments, multifunctional amines (e.g. diamines) are utilized in an amount of at least 1.0, 1.5, or 2 wt %. Thus, the polyurethane comprises urea moieties derived from multifunctional amines (e.g. diamine). The multifunctional amines (e.g. diamine) moieties are present in the hydrolyzed polyurethane is about the same ranges as just described.

Water Dispersible Crosslinker

The presently disclosed adhesive compositions include a water dispersible crosslinker. The term "water dispersible" as used herein means that the cross linker will remain suspended in water.

In some embodiments, crosslinkers useful in the present disclosure include those containing: i) from 30 to 99% by weight of one or more nonionic hydrophilic polyisocyanates obtained from the reaction of a) aliphatic or cycloaliphatic polyisocyanates containing from 3 to 10 isocyanate groups per molecule; b) at least one 1,3- or 1,2-nonionic diol containing a single alkoxy-terminated polyoxyethylene and/or polyoxypropylene chain; ii) from 1 to 20% by weight and preferably from 5 to 15% by weight, of one or more ethoxylated alcohol phosphates in acid form iii) from 0 to 50% by weight, and preferably from 5 to 30% by weight, of an organic solvent that is miscible with water. The ethoxylated alcohol phosphates in acid form useful in the present disclosure have the following general formula:

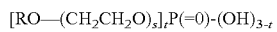

$$[RO-(CH_2CH_2O)_s]_t P(=O)-(OH)_{3-t}$$

wherein R is saturated or unsaturated, linear or branched alkyl group having from 4 to 20 carbon atoms, s is a number from 2 to 20, t is 1 or 2.

Particularly useful for the present disclosure are the above described ethoxylated alcohol phosphates having surfactant properties, in particular the ethoxylated alcohol phosphates in which R is a saturated, linear or branched alkyl group having from 12 to 15 carbon atoms and s is a number from 4 to 10. The use of these diols optimizes the hydrophilicity, maximizing the dispersibility and the poly-functionality of the polyisocyanate.

The nonionic hydrophilic polyisocyanates of the present disclosure contain from 1 to 25% by weight, preferably from 3 to 15% by weight, of polyoxyethylene and/or polyoxypropylene chains deriving from the aforesaid 1,3- and/or 1,2-nonionic diols, and may further contain up to 10% by weight of polyoxyethylene and/or polyoxypropylene chains deriving from the reaction of a polyisocyanate with other ethoxylated and/or propoxylated alcohols, such as, by way of example, the ethoxylated and/or propoxylated derivatives of methanol, n-butanol, cyclohexanol, 3-methyl-3-hydroxymethyloxyethane, ethylene glycol, propylene glycol, glycerol and trimethylolpropane, and mixtures thereof.

Examples of polyisocyanates useful in the present disclosure are the compounds obtained from trimerization, biurethization, urethanization or allophanation of polyisocyanates, such as hexamethylendiisocyanate, isophoronediisocyanate, 4,4'-dicyclohexylmethanediisocyanate and mixtures thereof. In some embodiments, the preferred polyisocyanate is the isocyanurate from hexamethylenediisocyanate. For example, in some embodiment, a useful crosslinker is that available under the trade designation "Bayhydur 302" from Bayer Materials Science LLC, Pittsburgh, Pa.

Silane Coupling Agent

Various silane coupling agents are useful in the present disclosure. Silane coupling agents have the ability to form a durable bond between organic and inorganic materials. Encounters between dissimilar materials often involve at least one member that's siliceous or has surface chemistry with siliceous properties; silicates, aluminates, borates, etc., are the principal components of the earth's crust. Interfaces involving such materials have become a dynamic area of chemistry in which surfaces have been modified in order to generate desired heterogeneous environments or to incorporate the bulk properties of different phases into a uniform composite structure.

Silane coupling agents useful in the present disclosure include 3-isocyanatopropyl triethoxy silane, and acetoxyethyl trimethoxy silane, commercially available from Sigma Aldrich, St. Louis, Mo.

Additive Polymers

In some embodiments, the adhesive composition may include an additive polymer, such as for example, an acrylic pressure sensitive adhesive component, a polyurethane dispersion, and the like.

In some embodiments, the adhesive composition may include an acrylic pressure sensitive adhesive component. In some embodiments, the acrylic pressure sensitive adhesive component comprises up to 45 wt % of the adhesive composition, preferably up to 30 wt % of the adhesive composition, and most preferably up to 15 wt % of the adhesive composition.

Pressure sensitive adhesives useful in the present disclosure include an aqueous based pressure sensitive adhesive latex (also referred to herein as "the latex"), a low adhesion additive, and a crosslinker. Aqueous based pressure sensitive adhesive latexes useful in the present disclosure include water-based acrylic pressure sensitive adhesives. Exemplary water-based acrylic pressure sensitive adhesives include latexes comprising:

a) 30 to about 70 wt %, based on the total weight of the aqueous based pressure sensitive adhesive latex, of a polymer phase comprising the reaction product of:

(i) 90 to 99 parts by weight, preferably 90 to 95 parts be weight, of an (meth)acrylic acid ester of non-tertiary alcohol, said alcohol having from 1 to 14 carbon atoms, with the average number of carbon atoms being from about 4 to about 12;

(ii) 1 to 10 parts by weight, preferably 2 to 7 parts by weight, of an acid functional monomer;

(iii) 0 to 10 parts by weight of a second, non-acid functional, polar monomer;

(iv) 0 to 5 parts by weight of vinyl monomer;

(v) 0 to 0.5 parts by weight of a chain transfer agent; and wherein the sum of (i) through (v) is 100 parts by weight, and (b) 70 to 30 wt % of an aqueous phase comprising 0.5 to about 8 wt % of a surfactant, preferably an anionic surfactant, based on the total weight of the latex.

In some embodiments the latex comprises about 50 to about 65 wt % polymer and about 35 to about 50 wt % aqueous phase, and in some embodiments about 55 to about 62 wt % solid phase and about 38 to about 45 wt % aqueous phase, based upon the total weight of the aqueous emulsion, in order to minimize the aqueous phase and thus conserve energy during the drying of the latex, in order to minimize storage and shipping costs, and in order to maximize plant productivity. The polymer component of the latex may comprise one or more polymers.

The acrylate ester monomer useful in preparing the polymer in the latex is a hydrophobic monomeric (meth)acrylic ester of a non-tertiary alcohol, which alcohol contains from 1 to 14 carbon atoms, and preferably an average of from 4 to 12 carbon atoms.

Examples of monomers suitable for use as the acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctyl alcohol, 2-ethyl-1hexanol, 1-decanol, 1-dodecanol, 1-tridecanol, 1-tetradecanol and the like. In some embodiments, the preferred acrylate ester monomer is the ester of acrylic acid with butyl alcohol or isooctyl alcohol, or a combination thereof, although combinations of two or more different acrylate ester monomer are suitable.

In some embodiments, the acrylate ester monomer is present in an amount of 90 to 99 parts by weight based on 100 parts total monomer content used to prepare the polymer (i.e. the total of i through v in the composition supra). In some embodiments, acrylate ester monomer is present in an amount of 90 to 95 parts by weight based.

The polymer further comprises an acid functional monomer, where the acid functional group may be an acid per se, such as a carboxylic acid, or a salt thereof such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, (3-carboxyethyl acrylate, 2-sulfoethyl methacrylate, styrene sulfonic acid, 2-acrylamido-2-methylpropanesulfonic acid, vinylphosphonic acid, and mixtures thereof.

The acid functional monomer is generally used in amounts of 1 to 10 parts by weight, preferably 1 to 5 parts by weight, based on 100 parts by weight total monomer.

The polar monomers useful in preparing the adhesive polymer are both somewhat oil soluble and water soluble, resulting in a distribution of the polar monomer between the aqueous and oil phases in an emulsion polymerization. Useful second polar monomers are non-acid functional.

Representative examples of suitable polar monomers include but are not limited to 2-hydroxylethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl)acrylates including 2-(2-ethoxyethoxy)ethyl acrylate, 2-ethoxyethyl acrylate, 2-methoxyethoxyethyl acrylate, 2-methoxyethyl methacrylate, polyethylene glycol mono(meth)acrylates; alkyl vinyl ethers, including vinyl methyl ether; and mixtures thereof. In some embodiments, polar monomers include those selected from the group consisting of 2-hydroxyethyl (meth)acrylate, acrylonitrile and N-vinylpyrrolidone.

When used, vinyl monomers useful in the acrylate adhesive polymer include vinyl esters (e.g., vinyl acetate and vinyl propionate), styrene, substituted styrene (e.g., a-methyl styrene), vinyl halide, and mixtures thereof. Such vinyl monomers are generally used at 0 to 5 parts by weight, preferably 1 to 5 parts by weight, based on 100 parts by weight total monomer.

In some embodiments, the additive polymer is an acrylic pressure sensitive adhesive, such as that commercially available under the trade designation "ACRONAL 81D" from BASF Corporation North America, Florham Park, N.J. In some embodiments, the additive polymer is a polyurethane dispersion, such as that commercially available under trade designation "INCOREZ W835/140" from Incorez Ltd, Iotech House, Miller street, Preston, Lancashire, PR1 1EA, England.

Other Additives

The presently disclosed adhesive compositions may include various other additives. These additives include, for example, tackifiers. Tackifier useful in the present disclosure include, for example, aqueous tackifiers, including resin dispersions made from rosin esters and terpene phenolic resins of varied softening point under trade designations "AQUATAC" from Arizona Chemical, Jacksonville, Fla. and "SNOWTACK" from Lawter, Chicago, Ill.

In addition to tackifiers, still other additives can be added in order to enhance the performance of the adhesive compositions. For example, leveling agents, oxygen inhibitors, rheology modifiers, wetting agents, defoamers, biocides, dyes, plasticizers, and the like, can be included herein. It is understood that any of these compounds can be used so long as they do not deleteriously affect the adhesive properties.

Also useful as additives to the present compositions are UV absorbers and hindered amine light stabilizers. UV absorbers and hindered amine light stabilizers act to diminish the harmful effects of UV radiation on the final cured product and thereby enhance the weatherability, or resistance to cracking, yellowing and delamination of the coating. Exemplary concentrations of UV absorbers include those in the range of 1 to 5 percent based on the total weight of the composition.

In some embodiments, the presently disclosed adhesive composition also include an adhesion promoter. In some embodiments, the adhesion promoter is a silane adhesion promoter.

The presently disclosed adhesive composition may be useful in double coated tape applications, such as for example, thin double coated tape applications. Thin double coat tapes include those tapes having a total thickness of 40 to 50 micrometers in the absence of any release liners. Such tapes can be used in the areas of electronics, appliances, automotive, and general industrial products. In some embodiments, the presently disclosed adhesive composition has a peel retention of greater than or equal to 80% according to the Olive Oil Exposure Test (described below).

The aqueous dispersion of amorphous polyurethane may be blended with additive resins to give adjustable peel adhesion. The presently disclosed adhesive composition can be laminated to solid substrates at ambient temperature and shows good high temperature/humidity stability and chemical resistance. The superior oil and alcohol resistance of the presently disclosed adhesive composition makes it attractive for various applications including automotive, aerospace, electronics and appliance markets where maintaining adhesive bond strength under high temperature/humidity and chemical environment are critical.

A non-limiting list of exemplary embodiments and combinations of exemplary embodiments of the present disclosure are disclosed below:

Embodiment 1

An adhesive composition comprising:
at least 50 wt % of an aqueous dispersion of an amorphous polyurethane having a Tg below 25° C.; and
a water dispersible cross-linker,
wherein the adhesive composition has a peel retention of greater than or equal to 5% according to the Water/IPA Exposure Test.

Embodiment 2

The adhesive composition of Embodiment 1 wherein the adhesive composition has a peel retention of greater than or equal to 80% according to the Olive Oil Exposure Test.

Embodiment 3

The adhesive composition of any of the preceding Embodiments further comprising an adhesion promoter.

Embodiment 4

The adhesive composition of Embodiment 3 wherein the adhesion promoter is a silane adhesion promoter.

Embodiment 5

The adhesive of any of the preceding Embodiments wherein the adhesive is a laminating adhesive.

Embodiment 6

The adhesive of Embodiment 5 wherein the laminating adhesive is activated at ambient temperature.

Various modifications and alterations of this invention will become apparent to those skilled in the art without departing from the scope and spirit of this invention.

EXAMPLES

| Materials | | |
|---|---|---|
| Designation | Description | Source |
| DISPERCOLL U42 | An aqueous anionic dispersion of a high molecular weight polyurethane of 50% solids in water available under the trade designation DISPERCOLL U42. | Bayer Materials Science LLC, Pittsburgh, PA. |
| DISPERCOLL U53 | An aqueous anionic dispersion of a high molecular weight polyurethane of 40% solids in water available under the trade designation DISPERCOLL U53. | Bayer Materials Science LLC, Pittsburgh, PA. |
| BAYHYDUR 302 | BAYHYDUR 302 is a water-dispersible polyisocyanate based on hexamethylene diisocyanate (HDI). | Bayer Materials Science LLC, Pittsburgh, PA. |
| isocyanato-propyl-Si(EtO)3 | 3-isocyanatopropyl triethoxy silane | Sigma Aldrich, St. Louis, MO |
| acetoxy ethyl Si(MeO)3 | acetoxyethyl trimethoxy silane | Sigma Aldrich, St. Louis, MO |
| SNOWTACK SE780G | Waterborne rosin ester-based tackifier (55% solids). | Lawter, Chicago, IL |
| AQUATAC 6025 | Low softening point tackifier dispersion for pressure sensitive adhesives. | Arizona Chemical, Jacksonville, FL |
| ACRONAL 81D | Aqueous dispersion of acrylic ester copolymer containing acrylonitrile. | BASF Corporation North America, Florham Park, NJ |
| silane terminated polyurethane | A self crosslinking, silane-terminated waterborne polyurethane dispersion synthesized from PPG diol (Mw = 2000), H12MDI and dimethylolpropionic acid, which was chain extended with carbohydrazide and ethylene diamine. | 3M Company, St. Paul, MN |
| INCOREZ W835/140 | Incorez W835/140 is a water based polyurethane dispersion of 32% solids. It has excellent chemical and stain resistance as well as good compatibility with acrylic emulsions. It is used in ink and print applications and floor and wall coatings. | Incorez Ltd, Lancashire, England |

Test Methods
Initial Peel Adhesion Strength

An adhesive tape sample with release liner measuring 12.5 millimeters wide by 30.5 cm long was cut and the release liner removed. The exposed adhesive surface of the adhesive tape was adhered along the length of a stainless steel plate (Type 304 having a bright annealed finish, obtained from ChemInstruments, Incorporated, Fairfield, Ohio) measuring 5.1 cm wide by 12.7 cm long by 0.12 centimeters thick using a 2.0 kg rubber roller and five passes to provide a test specimen. The plate was cleaned prior to applying the tape by wiping with acetone once then with heptane three times using a tissue paper (trade designation KIMWIPE, available from Kimberly-Clark Corporation, Irving, Tex.). After conditioning at 23° C. and 50% RH for 24 hours the test samples were evaluated for peel adhesion strength using a tensile tester (MTS Insight, available from MTS Systems, Corporation, Eden Prairie, Minn.) equipped with 1000 N load cell, using a crosshead speed of 30.5 cm/minute, at an angle of 180° with the test specimen held in the bottom clamp and the tail in the top clamp. The average of two test specimens was reported in N/millimeter (N/mm). In a similar manner, peel adhesion strength was also measured using a glass substrate in place of the stainless steel plate.

Olive Oil Exposure Test

An adhesive tape sample with release liner measuring 12.5 millimeters wide by 30.5 cm long was cut and the release liner removed. The exposed adhesive surface of the adhesive tape was adhered along the length of a stainless steel plate (Type 304 having a bright annealed finish, obtained from ChemInstruments, Incorporated, Fairfield, Ohio) measuring 5.1 cm wide by 12.7 cm long by 0.12 centimeters thick using a 2.0 kg rubber roller and five passes to provide a test specimen. The plate was cleaned prior to applying wiping with acetone once then with heptane three times using a tissue paper (trade designation KIMWIPE, available from Kimberly-Clark Corporation, Irving, Tex.). The test specimen was then conditioned at 70° for two hours, followed by equilibration at 23° C. and 50% RH for one hour. The test specimen was then immersed in a jar of extra virgin olive oil (Market Pantry brand, obtained from Target Corporation, Minneapolis, Minn.) such that the un-adhered length of adhesive tape was essentially above the oil level and hung out over the top of the bottle. A bottle cap was used to lightly seal the bottle shut. The bottle with test specimen was then conditioned at 65° C./90% relative humidity (RH) for 24 hours. A control sample was prepared in the same manner except it was not immersed in a jar of oil but placed in the conditioning chamber at a slight angle along its' length. The samples were then removed from the conditioning chamber, taken out of the bottle of oil where used, placed on an absorbent paper towel, and blotted dry with a second absorbent paper towel. After conditioning at 23° C. and 50% RH for 24 hours the test samples were evaluated for peel adhesion strength using a tensile tester (MTS Insight, available from MTS Systems, Corporation, Eden Prairie, Minn.) equipped with 1000 N load cell, using a crosshead speed of 30.5 cm/minute, at an angle of 180° with the test specimen held in the bottom clamp and the tail in the top clamp. The average of two test specimens was reported in N/millimeter (N/mm). Peel Retention (%) as calculated using the equation below.

Peel retention (%)=[(Peel after oil immersion)/(Peel control)]×100

Water/Isopropyl Alcohol (IPA) Exposure Test

Test specimens were prepared and evaluated for peel adhesion strength as described in "Peel Adhesion Strength: "After Olive Oil Exposure" above with the following modifications. A mixture of water:isopropyl alcohol (IPA)/1:1 (w:w) was used in place of the olive oil. Peel Retention (%) as calculated using the equation below.

Peel retention (%)=[(Peel after water/IPA immersion)/(Peel control)]×100

Differential Scanning Calorimetry (DSC)

Differential Scanning calorimetry (DSC) was used to evaluate adhesive polymer compositions for glass transition temperatures (Tg) and melting points (mp). Adhesive polymer was coated onto a release liner and dried. Adhesive polymer was then removed from the liner and between 5 and 10 milligrams of sample were placed into an aluminum sample pan which was then sealed shut. The sample pan and an empty control pan were heated from −60° C. to 150° C. at a rate of 5° C./minute using a differential scanning calorimeter (Model Q2000 DSC, available from TA Instruments, Incorporated, New Castle, Del.). A plot of heat flow vs temperature was used to identify Tg and mp values.

EXAMPLES

Examples E1 to E6 and Comparative Examples C1 to C3

Example 1 was prepared by mixing 100 grams of DISPERCOLL U42 with 1.0 gram of BAYHYDUR 302 in a glass jar using mechanical stirring at 300-500 rpm for 10 minutes. The resulting aqueous polyurethane composition was coated onto a 51 micrometer thick polyester film backing and dried in a 50° C. oven for 15 minutes to produce a single coated adhesive tape having an adhesive thickness of approximately 50 micrometers. To this tape was laminated an untreated 51 micrometer thick biaxially oriented polypropylene film release liner onto the exposed adhesive surface.

Examples 2-6 and Comparative Examples C1-C3 were prepared in a similar manner using the materials and amounts shown in Table 1 below.

TABLE 1

| Example | DISPERCOLL U42 (grams) | DISPERCOLL U53 (grams) | Isocyanatopropyl-triethoxy silane (grams) | Acetoxyethyl-trimethoxy silane (grams) | BAYHDUR 302 (grams) |
|---|---|---|---|---|---|
| 1 | 100.0 | | | | 1.0 |
| 2 | 100.0 | | | | 3.0 |
| 3 | 100.0 | | | | 5.0 |
| 4 | 100.0 | | 0.5 | | 3.0 |
| 5 | 100.0 | | | 0.5 | 3.0 |
| 6 | 70.0 | 30.0 | | | 3.0 |
| C1 | 100.0 | | | | none |
| C2 | | 100.0 | | | none |
| C3 | 70.0 | 30.0 | | | none |

TABLE 2

| Example | Finger Tack | Peel SS N/mm | Peel Glass N/mm | Olive Oil Peel Retention % | IPA/H2O Peel Retention % | Chemical Resistance at 65° C./90% RH Control N/mm | Olive Oil N/mm | IPA:H2O (50:50) N/mm |
|---|---|---|---|---|---|---|---|---|
| E1 | none | 0.78 | 0.61 | 118 | 65 | 0.97 | 1.14 | 0.63 |
| E2 | none | 0.80 | 0.59 | 122 | 35 | 0.83 | 1.01 | 0.29 |
| E3 | none | 0.60 | 0.56 | 117 | 49 | 0.82 | 0.96 | 0.40 |
| E4 | none | 0.95 | 0.92 | 89 | 11 | 1.57 | 1.40 | 0.17 |
| E5 | none | 0.93 | 0.83 | 112 | 47 | 0.91 | 1.02 | 0.43 |
| E6 | none | 1.17 | 1.17 | 127 | 17 | 1.14 | 1.45 | 0.19 |
| C1 | none | 0.65 | 0.55 | 118 | 3 | 0.88 | 1.04 | 0.03 |
| C2 | none | can't RT bond | can't RT bond | 0 | 0 | 0.00 | 0.54 | 0.00 |
| C3 | none | 0.88 | 0.88 | 130 | 1 | 0.98 | 1.27 | 0.01 |

Examples E7 to E10 and Comparative Examples C4 and C5

Example 7 was prepared by mixing 70 grams of DISPERCOLL U42 with 30 grams of AQUATAC 6025 and then 3.0 grams of BAYHYDUR 302 in a glass jar using mechanical stirring at 300-500 rpm for 10 minutes. The resulting aqueous polyurethane composition was coated onto a 51 micrometer thick polyester film backing and dried in a 50° C. oven for 15 minutes to produce a single coated adhesive tape having an adhesive thickness of approximately 50 micrometers. To this tape was laminated an untreated 51 micrometer thick biaxially oriented polypropylene film release liner onto the exposed adhesive surface.

Examples 8-10 and Comparative Examples C4 and C5 were prepared in a similar manner using the materials and amounts shown in Table 3 below.

E10 was made of U42 blended with a self-crosslinkable silane-terminated, waterborne polyurethane dispersion. The self-crosslinkable silane terminated polyurethane dispersion was prepared according to the following method. A 500 mL four-necked round bottom flask equipped with a mechanical stirrer, thermometer, condenser and nitrogen inlet was charged with 63.64 grams VORANOL 220-056N (PPG diol, Mw=2000) and 32.35 grams H12MDI. The polyaddition reaction was carried out under stirring at 78° C. in the presence of DBTDL of about 0.02 grams. After 1 hour of reaction, 4.0 grams DMPA (dimethylolpropionic acid) and 20 grams MEK was added. Then the reaction was carried out at 85° C. for about 3 hours until DMPA was dissolved to form a homogenous solution. The NCO content of the prepolymers was determined by standard dibutylamine back titration method. Upon obtaining the theoretical NCO value, the chains were extended by adding CHDM (cyclohexanedimethanol) of 4.39 grams, and allowed to react for 2.0 hours to form polyurethanes prepolymer, which was then cooled to about 40° C. and diluted by adding 60 grams acetone. The resulting prepolymers were then neutralized by the addition of TEA (3.02 grams) under stirring for 30 minutes, and then partially terminated by the addition of 1.21 grams Dynasylan AMEO for another 20 minutes, followed by adding 0.5 grams IRGANOX 1010 as an antioxidant and 0.5 grams TINUVIN 292 as a light stabilizer. Then a chain extender of CDH (carbohydrazide) of 1.52 grams in 6.0 grams water was added into the polyurathane prepolymer. After 5 minutes later, aqueous dispersion was accomplished by slowly adding 195 grams cold DI water of 5-10° C. to silane-terminated polyurethane prepolymer with vigorous stirring. Once the prepolymer was dispersed, the ED (ethylene diamine) of 0.34 grams in 5.0 grams water was slowly added for further chain extension under the stirring for about 1 hour. Then MEK/acetone was removed at 40° C. on a rotary evaporator, resulting in a silane-terminated polyurethane dispersion with a solids content of 35% by weight.

TABLE 3

| Example | DISPERCOLL U42 | SNOWTACK 780G | AQUATAC 6025 | ACRONAL 81D | INCOREZ W835/140 | Silane terminated polyurethane | BAYHYDUR 302 |
|---|---|---|---|---|---|---|---|
| E7 | 70.0 | | 30.0 | | | | 3.0 |
| E8 | 70.0 | 15.0 | | 15.0 | | | 3.0 |
| C4 | 70.0 | 15.0 | | 15.0 | | | 0.0 |
| C5 | 70.0 | | | | 30.0 | | 0.0 |
| E9 | 70.0 | | | | 30.0 | | 3.0 |
| E10 | 70.0 | | | | | 30.0 | 0.0 |

TABLE 4

| Example | Finger Tack | Peel SS N/mm | Peel Glass N/mm | Olive Oil Peel Retention % | IPA/H2O Peel Retention % | Chemical Resistance at 65° C./90% RH Control N/mm | Olive Oil N/mm | IPA:H2O (50:50) N/mm |
|---|---|---|---|---|---|---|---|---|
| E7 | slight | 0.42 | 0.46 | 111 | 40 | 0.73 | 0.81 | 0.29 |
| E8 | slight | 0.33 | 0.49 | 123 | 16 | 0.70 | 0.86 | 0.11 |
| C4 | slight | 0.48 | 0.66 | 126 | 0 | 0.77 | 0.97 | 0.00 |

TABLE 4-continued

| Example | Finger Tack | Peel SS N/mm | Peel Glass N/mm | Olive Oil Peel Retention % | IPA/H2O Peel Retention % | Chemical Resistance at 65° C./90% RH Control N/mm | Olive Oil N/mm | IPA:H2O (50:50) N/mm |
|---|---|---|---|---|---|---|---|---|
| C5 | none | 0.29 | 0.31 | 124 | 2 | 0.66 | 0.82 | 0.01 |
| E9 | none | 0.16 | 0.19 | 81 | 24 | 0.89 | 0.72 | 0.21 |
| E10 | none | 0.55 | 0.59 | 116 | 54 | 1.12 | 1.30 | 0.60 |

Example E11 and Comparative Example C6

Example 1 was prepared by mixing 100 grams of DISPERCOLL U42 with 3.0 grams of BAYHYDUR 302 in a glass jar using mechanical stirring at 300-500 rpm for 10 minutes. The resulting aqueous polyurethane composition was coated onto a 12.5 micrometer thick, corona treated polyester film backing and dried in a 50° C. oven for 15 minutes. To this single coated tape was laminated an untreated 51 micrometer thick biaxially oriented polypropylene film release liner onto the exposed adhesive surface. This process was repeated to provide a double coated adhesive tape with release liner covering each adhesive surface.

Comparative Example C6 was prepared in the same manner with following modification. No BAYHYDUR 302 was used.

TABLE 5

| Example | DISPERCOLL U42 | BAYHYDUR 302 |
|---|---|---|
| E11 | 100.0 | 3.0 |
| C6 | 100.0 | none |

TABLE 6

| Example | Finger Tack | Peel SS N/mm | Peel Glass N/mm | Olive Oil Peel Retention % | IPA/H2O Peel Retention % | Chemical Resistance at 65° C./90% RH Control N/mm | Olive Oil N/mm | IPA:H2O (50:50) N/mm |
|---|---|---|---|---|---|---|---|---|
| E11 | none | 0.80 | 0.66 | 244 | 100 | 0.32 | 0.78 | 0.32 |
| C6 | none | 0.68 | 0.64 | 1071 | 14 | 0.07 | 0.75 | 0.01 |

DSC Results

The DSC data indicate that DISPERCOLL U42 is an amorphous polyurethane having a Tg of 3.5° C. and DISPERCOLL U53 is a crystalline polyurethane having a melting point of about 50° C.

What is claimed is:

1. An adhesive composition comprising:
   at least 50 wt % of an aqueous dispersion of an amorphous polyurethane having a Tg below 25° C.;
   a water dispersible cross-linker, and
   an adhesion promoter which is acetoxyethyl trimethoxy silane.
2. The adhesive composition of claim 1 wherein the adhesive is a laminating adhesive.
3. The adhesive of claim 2 wherein the laminating adhesive is activated at ambient temperature.

* * * * *